(No Model.)

W. DEVOLL.
BALL BEARING.

No. 567,125. Patented Sept. 8, 1896.

Witnesses
M. W. Caskey.
Samuel S. Mehard

Inventor
William Devoll,
by Wm. L. Pierce
his Attorney

UNITED STATES PATENT OFFICE.

WILLIAM DEVOLL, OF ERDINGTON, ENGLAND.

BALL-BEARING.

SPECIFICATION forming part of Letters Patent No. 567,125, dated September 8, 1896.

Application filed December 19, 1895. Serial No. 572,693. (No model.)

*To all whom it may concern:*

Be it known that I, WILLIAM DEVOLL, a citizen of Great Britain, residing at Erdington, in the county of Warwick, England, have invented or discovered new and useful Improvements in Ball-Bearings, of which the following is a specification.

Figure 1:
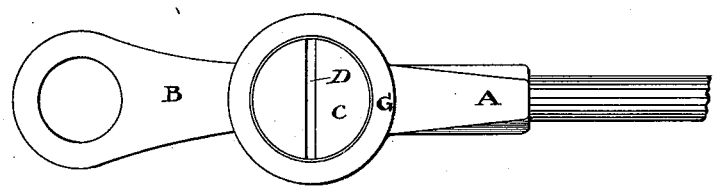
Figure 2:
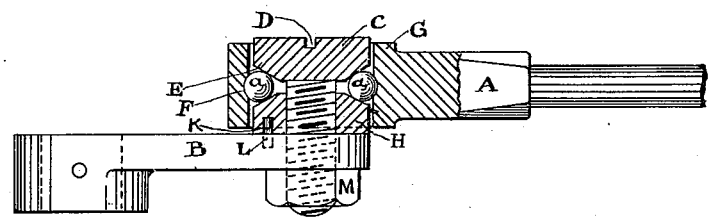

In the accompanying drawings, which make part of this specification, Figure 1 is a plan, and Fig. 2 a side elevation, partly in vertical section, showing my improvement.

The object of my invention, generally stated, is to provide a ball-bearing with a more simple form of adjustment, by which the balls may be spread and the bearing adjusted from the axis of said bearing, thereby permitting of the use of a solid eye or bearing-head inside of the parted bearing with side rings and bolt and nut at present in use, and all of which work loose, as is well known.

In the views I have illustrated my invention as applied to the crank-pin of a bicycle, but the principle of my invention is applicable to many styles of bearings, and I desire to claim the same broadly as well as specifically, since it can be employed wherever a ball-bearing is desirable in connecting any two given members.

In the two views, A is a broken coupling-rod of that style of driving-gear illustrated and described in United States Letters Patent No. 527,671, dated October 16, 1894, granted to me for driving-gear for velocipedes.

B is the crank, provided with a crank-pin in the shape of a bolt having head C and with preferably a fine thread. The inner side of head C is cone-shaped at E.

D is a slot in the head of bolt to receive a screw-driver.

F is a ball-race turned on the inside of solid eye G, formed on end of coupling-rod A. *a a* are balls in said race.

H is a nut, cone-shaped on the side toward balls *a a* and screwed on crank-pin. Said nut has seat K for socket-pin L on crank.

M is a securing-nut.

The parts are assembled by inserting crank-pin in eye G, placing balls in raceway, screwing on nut H until the balls are spread into the raceway and thus preventing withdrawal of bolt on crank side, putting on crank and seating socket-pin in its socket, thus preventing cone-nut H from turning, and screwing on securing-nut M.

When it is desired to adjust the balls to take up play, all that is necessary is to screw up crank-pin a little, thereby drawing cones closer together, which forces the balls outward into ball-race. Nut M is then tightened and the operation is complete.

Having described my invention, I claim—

In bearings, the combination of a member having an eye interiorly grooved as a ball-race; a second member having a threaded eye; a removable conical nut, adapted to be inserted in the eye of the first member, an independent rotatable bolt having a head interiorly beveled, said bolt passing through the eyes of both members and through the conical nut; balls between the nut and the inner side of the bolt-head; a pin on the second member registering with a pin-hole on the outer face of the nut to prevent the nut from rotating and a securing-nut on the end of the bolt outside the second member.

In testimony whereof I have hereunto set my hand this 3d day of December, A. D. 1895.

WILLIAM DEVOLL.

Witnesses:
JOHN HENRY FROST,
SIDNEY GEORGE FOWLER.